Aug. 23, 1960

E. A. MEYER 2,949,986

FASTENING DEVICE

Filed Sept. 22, 1954

INVENTOR
Engelbert A. Meyer
BY
L. D. Burch
ATTORNEY

United States Patent Office 2,949,986
Patented Aug. 23, 1960

2,949,986

FASTENING DEVICE

Engelbert A. Meyer, Detroit, Mich., assignor to General Motors Corporation, Detroit, Mich., a corporation of Delaware Filed Sept. 22, 1954, Ser. No. 457,713

1 Claim. (Cl. 189—88)

This invention relates to fastening devices, and more particularly to an inexpensive adjustable fastening device adapted to secure a trim member such as a molding strip to the edge of a support member.

It is often necessary to secure trim members such as moldings and the like to a support member, and many fasteners have been employed for this purpose. Such fasteners must generally be inexpensive to manufacture and apply and yet capable of satisfactorily securing the trim object without subsequent loosening and rattling.

Although the above has been satisfactorily accomplished in the case of the small, lighter moldings, the heavier, more substantial moldings have presented a greater problem. Often the weight of the heavier moldings or the forces which are naturally applied to such moldings in use of the object to which the moldings are attached are sufficient to weaken and make inoperative the snap type fasteners usually employed for this purpose.

An example of a heavier molding of this type is the finish molding employed on the inside of automobile door panels just below the window opening. In addition to being heavier than most trim moldings, this particular molding receives pressure from the arm of the passenger and is quite severely jarred each time the doors are opened and closed. A particular problem has been the satisfactory fastening of the end of such a molding, especially the end at the hinge side of the door where due to misalignment the molding may actually tend to be lifted away from the door inner panel, for example. Though this molding must be securely fastened, the fastening means must be invisible and capable of being easily disassembled and reassembled, if necessary.

It is now proposed to provide a fastening device adapted for securing a molding to a flanged support member, and particularly for securing the end of a molding such as that described above. The proposed fastening device is of simple design which is inexpensive to manufacture in that it comprises a spring clip stamped and formed from a spring metal strip and is adapted to be used together with a threaded or other standard type of fastener. The clip is provided with spaced slot means for positively engaging the flange of the support member under spring tension to provide an anchoring means for said clip to the support member which is more substantial and satisfactory than the common snap fastener anchoring devices. Also, the anchoring means is formed in a manner to provide adjustment, within limits, between the clip and the flange to take care of misalignment between the support member and the member to be secured thereto. Adjustment means is also provided in the portion of the clip adapted to secure the molding member to the clip so that adjustment is provided in the entire assembly in mutually perpendicular directions.

Figure 1:
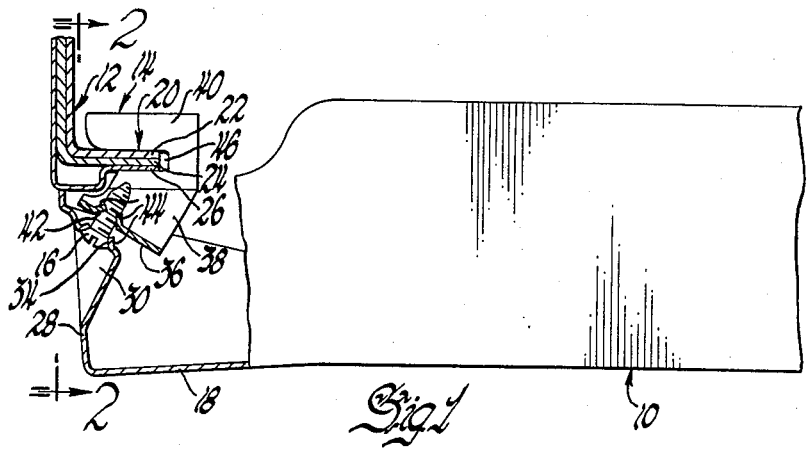
Figure 1 is a fragmentary top plan view with portions thereof cut away and in cross-section of a molding secured to a support member by means embodying the invention.
Figure 2:
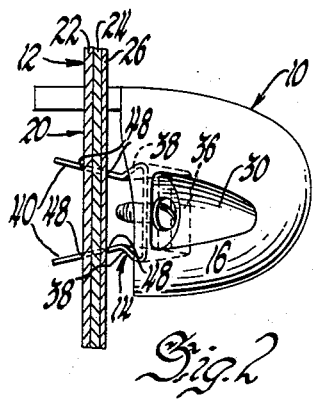
Figure 2 is an end elevational view taken in the plane 2—2 of Figure 1 and looking in the direction of the arrows.

Referring to the drawings in greater detail, an assembly embodying the invention may comprise a molding or other member 10 secured to a support member 12 by means of the fastening device 14 which may be used in conjunction with a standard threaded fastener 16. Although the invention may be employed to secure any two similar members in a like manner, the assembly shown by Figure 1 represents specifically, for purposes of illustration only, a typical finish molding employed on the interior of automobile doors along the bottom of the window opening. The end 18 of the molding 10 is to be secured to the composite vertical flange 20 formed from the various sheet metal thickness 22, 24 and 26 used in the door construction. In the particular assembly shown, the flange 20 is located at the hinge end of the door and disposed at right angles to the wall 12 so that in the closed position of the door the end wall 28 of the molding 10 may butt with an end wall of a similarly shaped molding or other trim member. The recess 30 in the end wall 28 receives a suitable fastener, such as the sheet metal screw 16, through the countersunk opening 34 and is hidden from view in the usual closed position of the door. Since the molding 10 is often employed as an arm rest and since the molding 10 is often quite severely jarred, especially when the door is slammed closed, it is desirable to provide substantial means for securing the end 18 of the molding 10 to the flange 20 in order to prevent the molding 10 from being lifted from the flange or rocked laterally with respect thereto.

Figure 5:
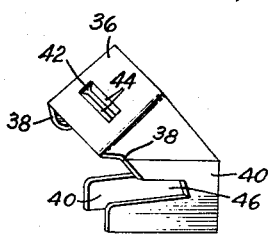
Figure 5 is a perspective view of the device shown by Figures 1 and 4.

For the above purpose, a clip device 14 such as that shown in perspective by Figure 5 may be employed. Such a clip may be suitably stamped and formed, and subsequently heat-treated if necessary, to provide a spring structure having a flat or otherwise suitably shaped head portion 36, intermediate portions 38 extending in the same direction from opposite ends of the head portion 36 and in converging relation to one another and leg portions 40 extending from the intermediate portions 38 and in diverging relation to one another. The head portion 36 may be slit or otherwise formed to provide a slot 42 having deformable tabs 44 extending from the sides thereof and adapted to engage a threaded fastener such as sheet metal screw 16 or other elongated fastener associated with the molding 10 to secure the molding to the head portion 36 of the clip 14. Alternatively, some other suitable means may be employed to secure the molding 10 to the clip 14. It will be noted that the leg portions 40 in the normal untensioned condition of the clip are spread outwardly so that the projected width of the slots 46 provided in the leg portions 40 on a plane bi-secting the angle between the leg portions 40 is considerably less than the actual width of the slots 46, or of the flange 20.

Figure 4:
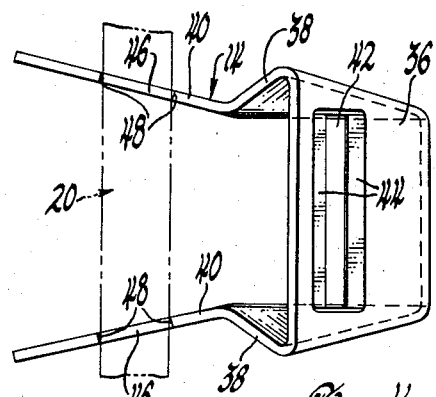
Figure 4 is a view similar to Figure 3 but illustrating the fastening device as applied to the support member.
Figure 3:
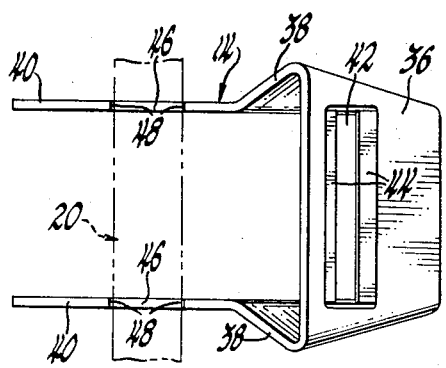
Figure 3 is an end elevational view of the preferred form of fastening device embodying the invention shown by Figures 1 and 2 and illustrating the manner in which the device is applied to the support member shown schematically by the broken lines.

Due to the spring properties of the clip 14 the leg portions 40 are adapted to be sprung together against the spring tension of the clip, as shown by Figure 3, so that the clip 14 may be applied to the flange 20 with the flange 20 being receivable with slight clearance in the slots 46, as better shown by Figure 1. It will be noted, from Figure 1 in particular, that the flange 20 may be received in the slots to varying amounts, depending upon the position of the end wall 28 of the molding 10 and the recess 30 therein with respect to the flange 20, which determines the conditions of alignment between the opening 34 in the recess 30 and the sheet metal screw receiving slot 42 in the head portion 36 of the clip 14. After the clip 14 is applied as shown in Figure 3, the leg portions 40 may be released so that they may spring back toward their original untensioned position but not completely thereto, as shown by Figure 4. In this position the clip 14 may not be rotated or moved laterally with respect to the flange 20, and the sharp stamped edges 48 defining the slots 46 bite into the sides of the flange 20 to prevent movement of the clip 14 lengthwise of the flange 20. After the clip 14 is thus applied to the flange 20, the molding 10 may be applied over the clip 14 and the sheet metal screw 16 or other stud fastener inserted into the opening 34 and threaded between the deformable tabs 44 in the head portion 36 of the clip.

It will be noted that the elongated screw receiving slot 42 in the head portion 36 of the clip 14 provides vertical adjustment between the clip and the molding so that the clip need be applied to the flange only in approximate position. Thus, there are provided two directions of adjustment in the entire assembly. It is further apparent that when the sheet metal screw 16 is sufficiently tightened the entire assembly is locked so that the spaced leg portions 40 prevent any movement of the assembly, including rocking movement of the molding 10 with respect to the flange 20.

The head portion 36 may be noted in the drawings as being obliquely disposed with respect to the leg portions 40, that is, in viewing the clip as shown in Figure 1, the plane containing the head portion 36 is not perpendicular to the plane containing the leg portions 40. This structure permits the end wall of the hollow member 10 to be secured to the supporting wall 12 which is substantially in the same plane. If the head portion were not so disposed, it is obvious that the securing sheet metal screw 16 would have to be inserted through the wall 18 to engage the slot 42 in the head portion 36. This would require a much longer sheet metal screw and would expose the head of the screw to the interior of the vehicle.

From the above specification and drawings, it is apparent that the proposed fastening device, in addition to securely locking the molding to the support, is of extremely simple design which is inexpensive to manufacture and which is readily applied or removed any number of times without impairing the efficiency of operation thereof or damaging any of the molding or support member parts. The device is adapted to secure any member fastened thereto to the edge of a support member.

What is claimed is:

A moulding strip installation comprising a support having a flange extending therefrom, a hollow moulding strip secured to said flange and having edge engagement with said flange, said moulding strip having an indentation formed therein adjacent said flange, the surface of said indentation having an opening therein and defining an acute angle with said flange, and a clip securing said moulding strip to said flange, said clip including a strip of spring metal formed to provide a flat head portion, said head portion having a slot therein receiving a threaded fastener extending through the opening in said indentation and securing said moulding strip at the inclined surface of said indentation to said head portion of said clip, intermediate portions at opposite ends of said head portion and extending therefrom in converging relation, and leg portions extending from said intermediate portions and in diverging relation, said leg portions being obliquely disposed with respect to said head portion and each of said leg portions having a supporting flange receiving slot therein transversely extending from the edge of said leg portion, said slots receiving said flange, said leg portions requiring forced substantially parallel alignment to receive the edge of said supporting flange within said slots in said leg portions and upon release having the slotted edges thereof biased in secure engagement with said supporting flange to retain said clip and said moulding strip secured thereto in rigid engagement to said supporting flange.

References Cited in the file of this patent

UNITED STATES PATENTS

| | | |
|---|---|---|
| 527,959 | Flesher | Oct. 23, 1894 |
| 977,704 | Brownlee | Dec. 6, 1910 |
| 1,063,663 | Davis | June 3, 1913 |
| 2,390,750 | Tinnerman | Dec. 11, 1945 |
| 2,426,237 | Pfeifer | Aug. 26, 1947 |
| 2,523,785 | Sereno | Sept. 26, 1950 |
| 2,634,473 | Price | Apr. 14, 1953 |
| 2,659,951 | Tinnerman | Nov. 24, 1953 |
| 2,671,254 | Meyer | Mar. 9, 1954 |
| 2,695,690 | Rees et al. | Nov. 30, 1954 |

FOREIGN PATENTS

| | | |
|---|---|---|
| 366,069 | Great Britain | Jan. 22, 1932 |